F. W. DODD.
VARIABLE SPEED AND REVERSING GEAR.
APPLICATION FILED APR. 24, 1908.
934,716. Patented Sept. 21, 1909.
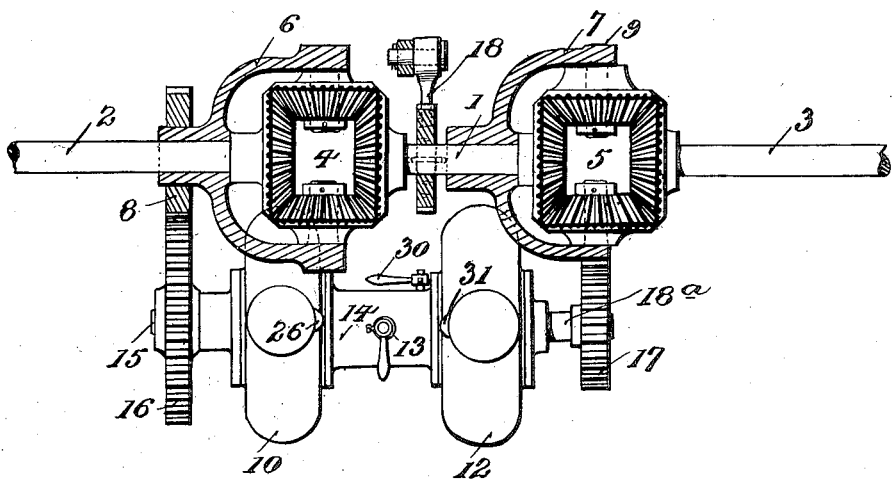
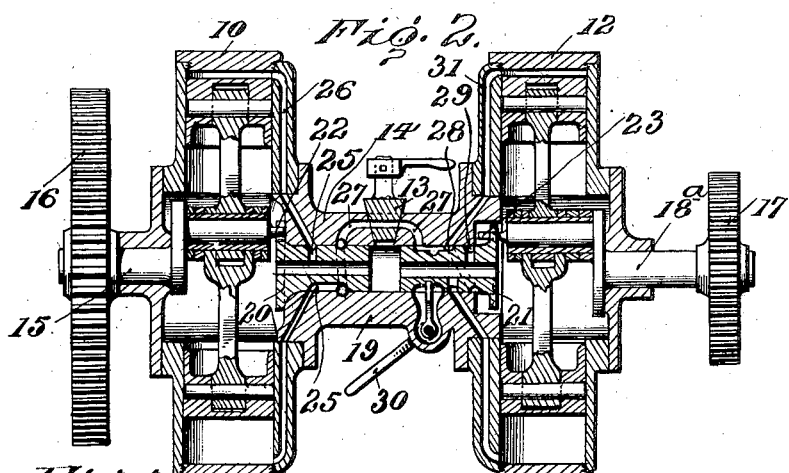
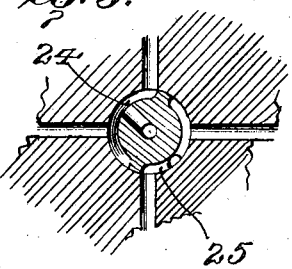
Inventor
Frank W. Dodd.
Witnesses
W. A. Williams.
By
Attorney

UNITED STATES PATENT OFFICE.

FRANK W. DODD, OF RODWELL, WEYMOUTH, ENGLAND.

VARIABLE-SPEED AND REVERSING GEAR.

934,716.

Specification of Letters Patent.

Patented Sept. 21, 1909.

Application filed April 24, 1908. Serial No. 429,059.

*To all whom it may concern:*

Be it known that I, FRANK WILLIAM DODD, of Connaught Road, Rodwell, Weymouth, in the county of Dorset, England, have invented certain new and useful Improvements in Variable-Speed and Reversing Gears; and I do hereby declare the following to be a full, clear, and exact description of the invention, such as will enable others skilled in the art to which it appertains to make and use the same.

This invention relates to variable speed and reversing gearing particularly applicable for use in connection with motor vehicles driven by engines of the internal combustion type, and it has for its primary object to provide simple and highly efficient means for enabling the speed of the driven part to be gradually increased or decreased, or the direction of rotation thereof to be reversed, independently of any corresponding increase or decrease in the speed of the engine, or change in the direction of its rotation.

For this purpose variable speed and reversing gearing according to my invention comprises a line of three shafts with epicyclic trains of gearing between the several shafts, a fluid pump and a fluid motor for controlling the rotation of the cross-heads or frames carrying the planet wheels of the epicyclic trains. To render the functions of the motor and pump intelligible it should be remarked that so long as each of these epicyclic trains is held against rotation as a whole, the ratio between the speed of the driving or engine shaft and the speed of the farthest removed or driven shaft is constant but by permitting more or less rotation of the first epicyclic train as a whole this ratio may be varied at will. Instead of using an ordinary braking mechanism to control the rotation of the first epicyclic train as a whole, I cause the cross head or frame carrying the planet wheels to operate a fluid pump with controllable outlet, and I utilize the fluid pressure so generated to rotate, by means of a fluid motor, the cross head of the second epicyclic train. The motor is also capable of being reversed for changing the direction of rotation of the second epicyclic train.

The invention will be hereinafter fully set forth and particularly pointed out in the claims.

In the accompanying drawings, Figure 1 is a plan view, with parts in section and other parts broken away. Fig. 2 is a transverse sectional view through the pump and motor. Figs. 3 and 4 are sectional detail views.

Referring to the drawings, 1 designates a short shaft located axially between the driving or engine shaft 2 and the driven or propeller shaft 3. Between these shafts are two epicyclic trains of intermeshing gear wheels 4 and 5, of corresponding diameters, the lateral or planet wheels of these trains being mounted in cross heads 6 and 7. These cross heads are free to rotate independently of the shafts except in so far as they are carrying the lateral or planet wheels of the trains, and are in mechanical connection with the pump and motor, respectively, as hereinafter described. Connected to or forming part of cross head 6 is a gear wheel 8 of small diameter, the other cross head 7 being provided with a gear wheel 9 of larger diameter. At high speed, the shaft 1 rotates in the opposite direction to shafts 2 and 3. It is immaterial in which direction shaft 2 is rotated, although it is usually turned toward the right.

Adjacent to the two epicyclic trains, forming the connections between the shaft sections, I locate a casing for the reception of oil, water and other fluid. This casing comprises two compartments, 10 and 12, which are adapted to be put into fluid communication with each other through a valve 13 located in connection 14 between the two compartments. The compartment 10 constitutes the casing for a pump which may be of the rotary type, or of the reciprocating inclosed type, its shaft or spindle 15 being arranged to project through the end of the casing in a direction parallel with the described shafts. A gear wheel 16 fixed on the pump-shaft is in mesh with the gear wheel 8 of the cross head 6 of the epicyclic train 4, which gear wheel 16 is shown as of twice the diameter of the gear wheel 8, but this ratio may be changed at pleasure. The other compartment 12 constitutes the casing of a motor which may also be of the rotary type or of the reciprocating inclosed type, and provided on its shaft or spindle with a gear wheel 17 of small diameter in mesh with the large gear wheel 9 of the cross head 7 of the epicyclic train 5.

In practice, when the vehicle is required to travel at top speed the fluid-control valve 13 is actuated to prevent circulation of fluid between the pump and the motor, with the result that the pump and the motor are held stationary and the cross heads of the two epicyclic trains are locked. The engine drive is now transmitted to the driven shaft wholly through the two epicyclic trains. When it is required to reduce the speed of the vehicle, and at the same time increase the power of the drive, the fluid-control valve 13 is partly open to put the pump and motor more or less into fluid communication with each other. The cross head of the first epicyclic train being gradually relieved of the locking or braking action of the pump now commences to rotate and drives the pump at a reduced speed through the larger gear wheel 16. Motive power in the form of fluid is now supplied to the motor, which rotates the cross head of the second epicyclic train at a further reduced speed through gear wheel 17 on the motor shaft acting through gear wheel 9 incorporated with the cross head of the second epicyclic train. The speed gained by the driving of the cross-head of the second epicyclic train is much less than the speed lost by the permitted rotation of the cross-head of the first epicyclic train, and the speed of the farthest removed or driven shaft is consequently reduced, but with a corresponding gain in tractive force. By gradually opening the passage-way between the pump and the motor, any desired portion of the power may be allowed to pass through the cross head of the first epicyclic train, the pump, and the motor, to the cross head of the second train and the part to be driven, so as to gradually reduce the velocity of the latter and increase the power of the drive. If the gear wheels 8 and 16 and the gear wheels 9 and 17 are proportioned as shown in Fig. 1, the driven shaft will be revolved at about one-fourth the speed of the engine or driving shaft, but with about four times the rotative force when the valve 13 is fully open and all resistance to the rotation of the pump and the cross-head 6 is removed. Between these limits any proportion of speed between the driving shaft and the driven shaft is obtainable by varying the flow from the pump to the fluid motor by manipulating the valve 13. It is to be noted that the speed variation may also be brought about by varying the capacity of the pump instead of by employing gear wheels of different sizes. For instance, if in using a three-cylinder pump, and a three-cylinder fluid motor, two cylinders of the pump be closed or cut out of operation, the fluid motor will travel at only one-third of the speed of the pump, but with three times the rotative force. The pump and fluid motor, with means for varying the capacity of the former, contain in themselves all the elements of a change speed mechanism. The pump and motor capacities are so proportioned that when the passage-way between them is wide open the whole of the drive of the engine will be transmitted therethrough and the vehicle will run on its lowest speed. At speeds approaching the low limit the intermediate shaft 1 and its beveled gear wheels have to provide the mechanical abutment or reaction for the force transmitted through the fluid motor to the cross head 7 of the second epicyclic train, and in order to prevent any possibility of such shaft rotating in a backward direction, a brake or ratchet or other suitable device, conventionally indicated at 18, may be applied to the shaft to prevent rotation thereof in the wrong direction or for locking the same when required. But this is not essential and may be omitted since there is a definite limit to the speed of any backward rotation of shaft 1, which, if allowed to go free, will result in producing a further reduced speed of the vehicle.

Although I do not restrict myself to any particular form of pump or of fluid motor, I have shown in Figs. 2, 3 and 4, an arrangement which has proved satisfactory. The pump 10, except in regard to its valve arrangement, is of well-known form, and embodies four cylinders radiating from a common crank chamber and fitted with four single-acting pistons driven from a crank on the shaft or spindle 15. The fluid motor, shown in Fig. 2, is a duplicate of the pump, its piston being actuated by a crank on its shaft or spindle 18$^a$. The connecting valve chamber 19 has a longitudinal bore to accommodate the rotary pump-valve 20 and the rotary motor-valve 21. These valves are actuated by extensions 22 and 23 of the respective crank pins, and each valve is drilled along its axis so that the crank chambers of the pump and motor are in free communication and form a common reservoir for the fluid. As the pump valve rotates channels 24 and 25, each extending nearly half way around the valve (see Fig. 3) place the ports 26 leading to the pump cylinders in communication with the reservoir space during the inward stroke of the respective pistons, and with the pressure delivery passage 27 during the outward stroke of the respective pistons. The motor rotary valve 21 is the same as the pump valve 20 in general principle, but it has two sets or pairs of controlling channels 28 and 29 for admitting pressure from passage 27 into the cylinders of the motor. One pair of ports, 28, is so situated in reference to the crank of the motor shaft as to drive the motor in the same direction as the pump, while the other pair of ports, 29, when brought into action will cause the motor to rotate in the opposite direction to the pump. Provision is made by means of a lever-arrangement 30 for sliding the motor valve 21 axially and bringing either set of ports 28 or 29 opposite the motor cylinder supply ports 31 which correspond to the ports 26 of the pump. By this means the direction of rotation of the driven shaft may be reversed when on slow speed. By rotating the control valve 13 and closing the pressure delivery passage 27, I block all outlet from the pump, and thereby bring the latter to a standstill, thus locking the wheels 8 and 9 of the cross-heads of the respective epicylic trains. A direct drive at full speed through the several shaft sections and the two epicyclic trains is thus obtained. Any intermediate speed is obtainable by partially opening or closing the valve 13, and thus the change of speed is secured without the necessity of actuating any clutch or throwing any gear wheels into or out of mesh.

When operating under full speed with the pump and motor stationary, the intermediate shaft 1 will revolve in the opposite direction to the driving shaft 2 through the revolution on their respective axes of the planetary wheels of train 4, and the driven shaft 3 will, in turn, be revolved in the same direction as the engine shaft, the planetary wheels of the train 5 being also revolved on their respective axes. When the valve 13 is partially opened, only a portion of the power will be conveyed to the driven shaft direct through shaft 1, the balance of the power being through the pump and motor. The cross head of train 4 will now revolve on shaft 2 to actuate the pump, and the planetary wheels of that train will effect the driving of shaft 1 at a speed lower than their axial speeds, since their cross head is itself revolving. The cross head of train 5 being revolved by the motor, the driven shaft is revolved at a speed greater than that of shaft 1. When valve 13 is fully opened, so that the driven shaft will travel at the lowest speed, the intermediate shaft 1 will be stationary, the planetary wheels of the two trains, 4 and 5, revolving as a system around the sun wheels as well as on their respective axes. This is also true when the direction of the motor is reversed for driving shaft 3 in the opposite direction to the engine shaft. Any tendency of shaft 1 to rotate at low speeds may be prevented, as before stated, by the application of a brake or other suitable device.

I claim as my invention:—

1. In combination with a plurality of shafts, two epicyclic trains of wheels located between such shafts, a pump, and a fluid motor for conveying any desired proportion of the power from one epicyclic train of wheels to the other.

2. In combination with a plurality of shafts, two epicyclic trains of wheels located between such shafts, a pump, a fluid motor for conveying any desired proportion of the power from one epicyclic train of wheels to the other, and means for controlling the passage of fluid from the pump to the motor for regulating the amount of power so conveyed.

3. In combination with a plurality of shafts, two epicyclic trains of wheels located between such shafts, a pump, a fluid motor for conveying any desired proportion of the power from one epicyclic train of wheels to the other, means for controlling the passage of fluid from the pump to the motor for regulating the amount of power so conveyed, and means for reversing the direction of rotation of the motor.

4. In combination with a plurality of shafts, two epicyclic trains of wheels located between such shafts, a pump, and a fluid motor for conveying any desired proportion of the power from one epicyclic train of wheels to the other, said pump and said motor preventing bodily rotation of the epicyclic trains when no power is being conveyed through the pump and motor.

In testimony whereof, I have signed this specification in the presence of two subscribing witnesses.

FRANK W. DODD.

Witnesses:
  J. NOTA McGILL,
  FRANCIS S. MAGUIRE.